(12) United States Patent
Gooden et al.

(10) Patent No.: US 10,378,421 B2
(45) Date of Patent: Aug. 13, 2019

(54) AUTOMATIC TRANSMISSION FLUID THERMAL CONDITIONING SYSTEM

(71) Applicant: FORD GLOBAL TECHNOLOGIES, LLC, Dearborn, MI (US)

(72) Inventors: James Thomas Gooden, Canton, MI (US); Michael Joseph Giunta, Livonia, MI (US); David Curtis Ives, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 864 days.

(21) Appl. No.: 14/491,350

(22) Filed: Sep. 19, 2014

(65) Prior Publication Data

US 2016/0084142 A1   Mar. 24, 2016

(51) Int. Cl.
| | |
|---|---|
| *F01P 3/20* | (2006.01) |
| *F01P 7/16* | (2006.01) |
| *F01P 11/08* | (2006.01) |
| *F16H 57/04* | (2010.01) |

(52) U.S. Cl.
CPC ............... *F01P 3/20* (2013.01); *F01P 7/161* (2013.01); *F01P 7/165* (2013.01); *F01P 11/08* (2013.01); *F16H 57/04* (2013.01); *F01P 2060/045* (2013.01); *F01P 2060/12* (2013.01); *F01P 2060/18* (2013.01)

(58) Field of Classification Search
CPC ........ F01P 2060/045; F01P 7/165; F01P 7/16; F01P 7/167; F01P 7/168; F01P 3/20; F01P 2060/04; B60H 1/00885; F16H 57/0413; G05D 23/1333

USPC .... 123/41.01, 41.31, 41.33, 41.09; 180/339; 236/34.5
See application file for complete search history.

(56) References Cited

U.S. PATENT DOCUMENTS

| | | | |
|---|---|---|---|
| 4,196,847 A * | 4/1980 | Gobien | ................... F01P 7/16 236/100 |
| 4,288,031 A * | 9/1981 | Hass | ....................... F01P 7/16 123/41.1 |
| 4,930,455 A | 6/1990 | Creed et al. | |

(Continued)

FOREIGN PATENT DOCUMENTS

| | | |
|---|---|---|
| CN | 202348405 U | 7/2012 |
| CN | 102853062 A | 1/2013 |

(Continued)

OTHER PUBLICATIONS

Chinese Office Action dated Sep. 17, 2018 in the corresponding Chinese Application No. 201510599727.0, 8 pages.

*Primary Examiner* — Jacob M Amick
*Assistant Examiner* — Michael A Kessler
(74) *Attorney, Agent, or Firm* — David Kelley; Brooks Kushman P.C.

(57) ABSTRACT

A vehicle cooling system includes an internal combustion engine, a transmission having a cooler, a coolant pump, a first coolant loop, a second coolant loop, and a flow regulator. The first coolant loop fluidly connects the coolant pump to the engine and returns to the coolant pump. The second coolant loop fluidly connects the coolant pump to the transmission cooler and returns to the coolant pump, bypassing the engine. The flow regulator is configured to selectively restrict coolant flow through the second coolant loop.

14 Claims, 4 Drawing Sheets

(56) References Cited

U.S. PATENT DOCUMENTS

| | | | | |
|---|---|---|---|---|
| 5,121,714 | A * | 6/1992 | Susa | F01P 7/165 |
| | | | | 123/41.1 |
| 6,053,131 | A * | 4/2000 | Mueller | F01M 5/007 |
| | | | | 123/196 AB |
| 6,196,168 | B1 | 3/2001 | Eckerskorn et al. | |
| 6,530,347 | B2 * | 3/2003 | Takahashi | F01P 7/048 |
| | | | | 123/41.1 |
| 6,772,715 | B2 * | 8/2004 | Pfeffinger | F01P 3/20 |
| | | | | 123/41.31 |
| 7,267,084 | B2 * | 9/2007 | Lutze | F01P 3/20 |
| | | | | 123/41.02 |
| 7,779,791 | B2 * | 8/2010 | Holzbaur | F01P 7/165 |
| | | | | 123/41.29 |
| 7,987,836 | B2 | 8/2011 | Kurtz et al. | |
| 8,196,707 | B2 | 6/2012 | Kardos | |
| 2006/0157002 | A1 * | 7/2006 | Pfeffinger | F01P 7/162 |
| | | | | 123/41.29 |

FOREIGN PATENT DOCUMENTS

| | | |
|---|---|---|
| DE | 10301448 A1 | 7/2004 |
| JP | H07259971 A | 10/1995 |
| JP | 2006207606 A | 8/2006 |
| JP | 4013832 B2 | 11/2007 |
| JP | 4457848 B2 | 4/2010 |

* cited by examiner

AUTOMATIC TRANSMISSION FLUID THERMAL CONDITIONING SYSTEM

TECHNICAL FIELD

This application relates to a temperature control system for a vehicle, in particular for cooling an automatic transmission.

BACKGROUND

Automatic transmissions include meshing gearing elements which can be lubricated with oil referred to as automatic transmission fluid, or ATF. During sustained vehicle operation the temperature of the transmission fluid may become elevated due to the friction of the meshing gearing elements and other sources. However at elevated temperatures, transmission fluid experiences effects such as oxidization, which impacts the lubricative properties of the transmission fluid.

Consequently, an automatic transmission may be provided with a heat exchanger in fluid communication with the transmission. The heat exchanger may be referred to as a transmission cooler. The transmission cooler may be an oil/air cooler or a water/oil cooler. In vehicles with water/oil coolers, the transmission cooler may be incorporated into an existing engine cooling circuit.

SUMMARY

A temperature control system for transmission lubricant in a motor vehicle according to the present disclosure includes an internal combustion engine, a transmission lubricant heat exchanger, a coolant pump having an inlet and an outlet, a coolant circuit, a coolant bypass, and a thermostat. The coolant circuit fluidly connects, from an upstream direction to a downstream direction, the pump outlet, the engine, and the pump inlet. The coolant bypass has a first end and a second end. The first end fluidly is connected to the coolant circuit upstream of the engine, and the second end is fluidly connected to the coolant circuit downstream of the engine. The coolant bypass is in fluid communication with the transmission lubricant heat exchanger. The thermostat is configured to reduce a flow quantity through the coolant bypass in response to a decrease in a coolant temperature at the thermostat and to increase a flow quantity through the coolant bypass in response to an increase in a coolant temperature at the thermostat.

In some embodiments, the internal combustion engine includes a first cylinder head and a second cylinder head. In such embodiments, the coolant circuit comprises a first coolant passage and a second coolant passage. The first coolant passage is fluidly connected to the first cylinder head and subsequently to the pump, and the second coolant passage is fluidly connected to the second cylinder head and subsequently to the pump. The first coolant passage may be additionally fluidly coupled to an EGR cooler between the first cylinder head and the pump. The second coolant passage may be additionally fluidly coupled to a turbocharger or an oil cooler between the second cylinder head and the pump. In some embodiments, the coolant circuit additionally connects the coolant pump to a cabin heater core and a radiator, wherein the cabin heater core and radiator being in a downstream direction from the engine.

A method of controlling lubricant temperature in a motor vehicle transmission according to the present disclosure, wherein the vehicle has a temperature control system comprising a coolant circuit fluidly connecting a coolant pump, an internal combustion engine, a transmission cooler, and a thermostat configured to adjust a coolant flow rate through the cooler, includes dividing coolant flow leaving the coolant pump into first and second fractions. The first fraction is directed to the internal combustion engine and subsequently back to the coolant pump. The second fraction is directed to the transmission cooler and subsequently back to the coolant pump, bypassing the internal combustion engine. The method additionally includes varying the first fraction and second fraction in response to a change in coolant temperature at the thermostat.

In some embodiments, varying the first and second fractions includes operating a thermostat to vary a coolant flow quantity through the transmission cooler. In an additional embodiment, a portion of the first fraction is directed to a cabin heater core between the internal combustion engine and the heater pump.

A vehicle cooling system according to the present disclosure includes an internal combustion engine, a transmission having a cooler, a coolant pump, a first coolant loop, a second coolant loop, and a flow regulator. The first coolant loop fluidly connects the coolant pump to the engine and returns to the coolant pump. The second coolant loop fluidly connects the coolant pump to the transmission cooler and returns to the coolant pump, bypassing the engine. The flow regulator is configured to selectively restrict coolant flow through the second coolant loop.

In various embodiments, the flow regulator comprises a thermostat configured to decrease an amount of coolant flow through the second coolant loop in response to a decrease in a coolant temperature and increase an amount of coolant flow through the second coolant loop in response to an increase in a coolant temperature. In some embodiments, the internal combustion engine includes a first cylinder head and a second cylinder head. In such embodiments, the first coolant loop comprises a first coolant passage and a second coolant passage. The first coolant passage is fluidly connected to the first cylinder head and subsequently to the pump, and the second coolant passage is fluidly connected to the second cylinder head and subsequently to the pump. The first coolant passage may be additionally fluidly coupled to an EGR cooler between the first cylinder head and the pump. The second coolant passage may be additionally fluidly coupled to a turbocharger or an oil cooler between the second cylinder head and the pump. In some embodiments, the first coolant loop additionally connects the coolant pump to a cabin heater core and a radiator, wherein the cabin heater core and radiator being in a downstream direction from the engine.

Embodiments according to the present disclosure provide a number of advantages. For example, cooling systems according to the present disclosure may heat transmission fluid more rapidly and to higher temperatures than known systems, which may lead to increased fuel economy. In addition, cooling systems according to the present disclosure maintain transmission fluid within allowable temperature ranges. Furthermore, cooling systems according to the present disclosure may prioritize cabin heating when preferable, such that consumer comfort is not adversely impacted.

The above and other advantages and features of the present disclosure will be apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In many automotive engine implementations, two separate coolant circuits are provided. One circuit is a low temperature circuit, designed to maintain a relatively lower temperature in components that are more sensitive to high temperatures. The other circuit is a high temperature circuit, designed to maintain a relatively higher temperature in components that are less sensitive to high temperatures.

Figure 1A:
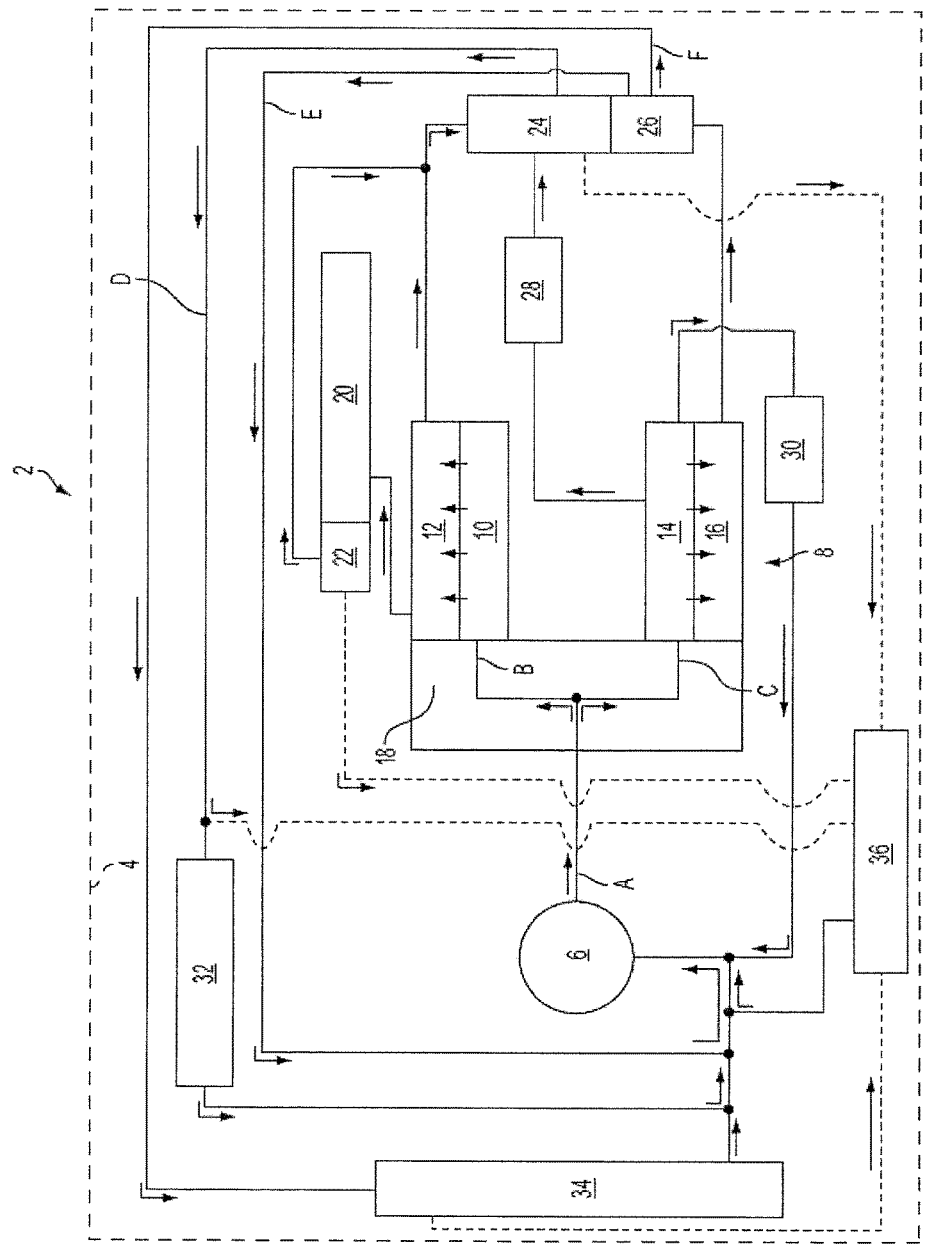
FIGS. 1A and 1B schematically illustrate a representative prior art coolant system for a motor vehicle.
Figure 1B:
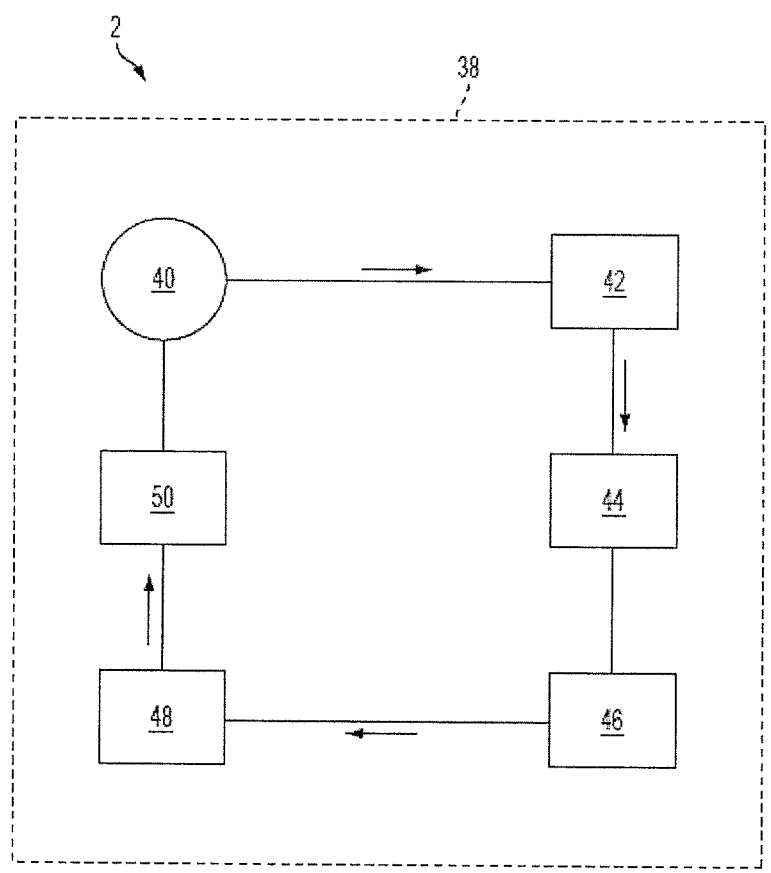

Referring now to FIGS. 1a and 1b, a prior art temperature control system 2 is illustrated schematically. The temperature control system 2 is implemented to control the temperatures of various components in a motor vehicle, as will be discussed below. The temperature control system 2 includes a high temperature circuit 4, illustrated in FIG. 1a, and a low temperature circuit 38, illustrated in FIG. 1b. The high temperature circuit 4 and low temperature circuit 38 each are made up of a plurality of conduits in fluid communication with various engine components and, when in use, containing a coolant.

Referring to the high temperature circuit 4 shown in FIG. 1a, the temperature control system 2 includes a coolant pump 6. The coolant pump 6 directs coolant from an upstream direction to a downstream direction, as illustrated by arrows. The coolant pump 6 is in fluid communication with an internal combustion engine 8. The internal combustion engine 8 includes a right cylinder bank 10 with an associated right cylinder head 12 and a left cylinder bank 14 with an associated left cylinder head 16. The internal combustion engine 8 additionally includes a front cover 18. The internal combustion engine 8 is provided with a water jacket (not specifically illustrated) which extends through individual regions of a wall of the internal combustion engine 8. A fluid passage A flows from the coolant pump 6 to the front cover 18 and splits into a fluid passage B flowing to the right cylinder bank and a fluid passage C flowing to the left cylinder bank.

The temperature control system additionally includes an EGR cooler 20. Exhaust gas recirculation (EGR) supplies a portion of exhaust gas to the combustion air to obtain emissions that are environmentally less damaging. Since the exhaust gas generally has a high temperature, the recirculation thereof leads to a reduced air mass with correspondingly lower oxygen in the air. The EGR cooler 20 is used to cool the hot exhaust gas before it is recirculated into the combustion process. In this way, it is possible to increase the proportion of oxygen in the air, leading to an increase in the exhaust gas quality by virtue of improved combustion. The EGR cooler 20 is in fluid communication with and downstream of the right cylinder head 12. A valve 22 is configured to control exhaust gas flow through the EGR cooler 20.

Coolant flows through the EGR cooler 20 and the valve 22 to a crossover 24. The crossover 24 is provided with a thermostat 26 configured to divide coolant among fluid passages E and F as will be discussed below. When closed, coolant from the right cylinder head 12 bypasses the EGR cooler 20 and flows directly to the crossover 24.

Returning to fluid passage C, a portion of coolant flows from the left cylinder bank 14 to a turbocharger 28 and subsequently to the crossover 24. A second portion of coolant flows from the left cylinder bank 14 to an oil cooler 30 and subsequently back to the coolant pump 6. A third portion of coolant flows from the left cylinder head 16 to the thermostat 26.

A portion of the coolant from the crossover 24 is directed to a cabin heater core 32 via fluid passage D. The cabin heater core 32 is designed as a gas/coolant heat exchanger. This enables the interior heater to release the thermal energy contained in the coolant to the air in the interior of the vehicle. This is achieved by air being sucked in from outside the vehicle or from the interior thereof (recirculated air) and routed past or through regions of the interior heater which are in contact with the coolant. This is accomplished by means of a fan, for example. As the air passes through the interior heater, it absorbs some of the thermal energy before finally being directed into the interior of the vehicle. Coolant flows from the cabin heater core 32 back to the coolant pump 6.

A second portion of coolant from the crossover 24 is directed back to the coolant pump 6 via the thermostat 26 and fluid passage E.

A third portion of coolant from the crossover 24 is directed to a radiator 34 via the thermostat 26 and fluid passage F. The radiator 34 is a coolant/gas heat exchanger configured to remove heat from the coolant. Coolant flows from the radiator 34 back to the coolant pump 6.

The relative quantities of coolant distributed among the fluid passages E and F is controlled by the thermostat 26. The thermostat 26 may be an electronically controlled thermostat or valve. The thermostat 26 may be configured to increase the coolant portion directed to the radiator 34 in response to an increase in coolant temperature.

The high temperature circuit 4 additionally includes a coolant reservoir 36. The coolant reservoir 36 stores coolant and compensates for any fluctuations in the coolant level. The coolant reservoir 36 also serves as a reserve volume to create space for the coolant expansion due to temperature increase. In addition, the coolant reservoir 36 may remove entrained air from the coolant. For these purposes, the coolant reservoir 36 is connected to various points in the high temperature circuit 4 by compensating lines, illustrated by the dashed lines.

The high temperature circuit 4 is implemented in conjunction with a low temperature circuit 38, illustrated in FIG. 1b. As discussed above, the low temperature circuit 38 is designed to maintain a relatively lower temperature in components that are more sensitive to high temperatures. The low temperature circuit 38 includes a coolant pump 40. The coolant pump may be a separate pump from the coolant pump 6 of the high temperature circuit, though in some systems the two circuits 4 and 38 may use a common pump. The coolant pump 40 directs coolant through a fluid passage to an EGR cooler 42. The EGR cooler 42 is the same as the EGR cooler 20 illustrated in FIG. 1a, with the fluid passage providing an additional coolant path through the cooler. Coolant is then directed to a charge air cooler 44, a fuel heat exchanger 46, and subsequently to a transmission cooler 48. Coolant is then directed to a radiator 50. The radiator may be integrated as a common radiator with the radiator 34 illustrated in FIG. 1*a*, or may be a separate radiator. Coolant then returns to the coolant pump 40.

Temperature control systems as described above may perform adequately in maintaining temperatures at acceptable ranges for the various vehicle components in the respective cooling circuits. However, as the temperature of transmission fluid increases, the viscosity of the fluid decreases, thus decreasing the torque required to drive the meshing gearing elements lubricated by the fluid. Thus, while transmission fluid is sensitive to increased temperatures as discussed above, an increase in temperature of transmission fluid may correspond to an increase in fuel economy. A moderate increase in the temperature of transmission fluid, in conjunction with reducing a portion of engine operating time at which the fluid is cold, may lead to a surprising increase in overall vehicle fuel economy.

Figure 2:
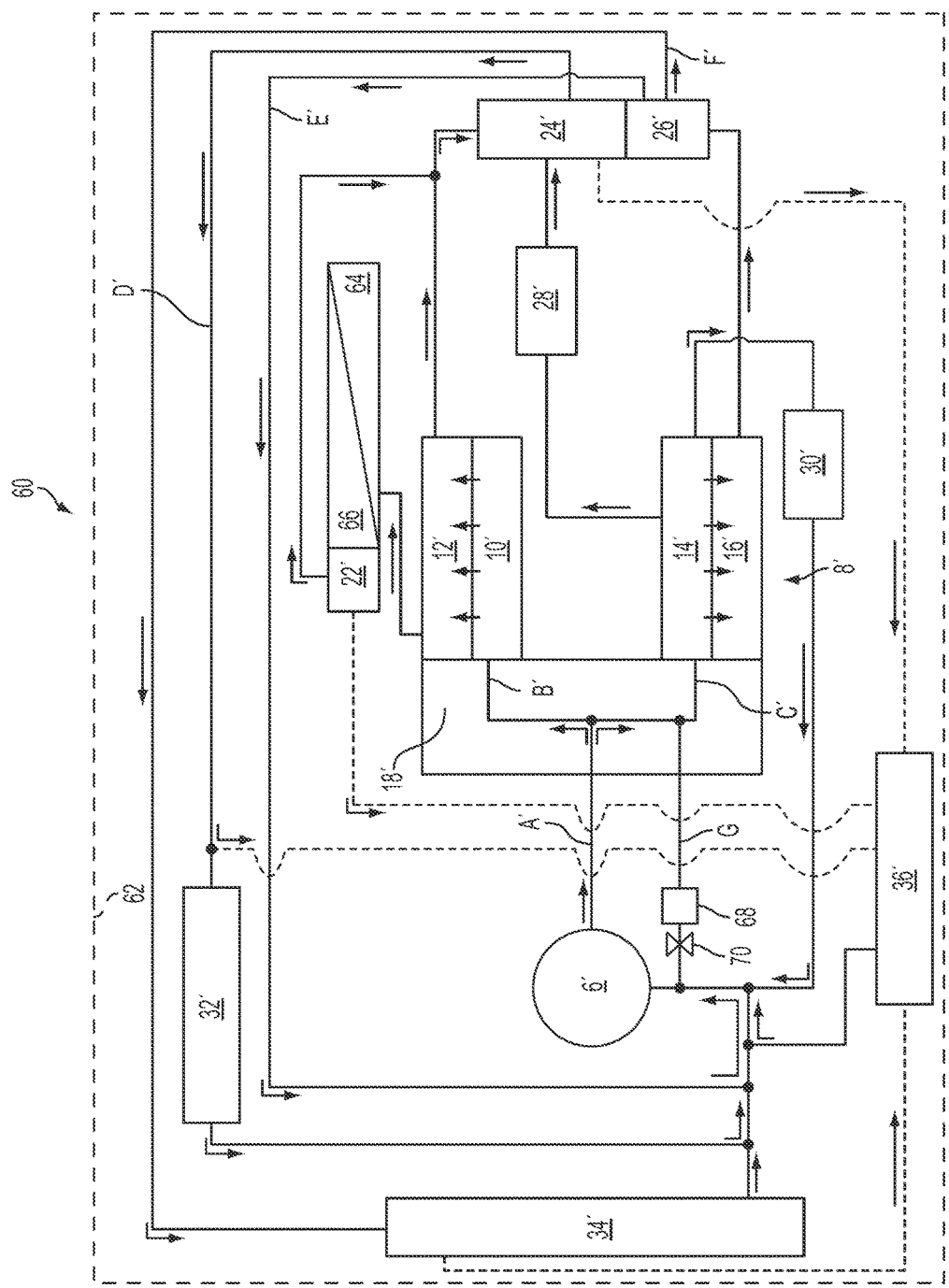
FIG. 2 schematically illustrates a coolant system for a motor vehicle according to the present disclosure.

Referring now to FIG. 2, a temperature control system 60 according to the present disclosure is illustrated. The temperature control system 60 includes a high temperature circuit 62 and a low temperature circuit (not specifically illustrated). The temperature control system 60 includes a coolant pump 6'. The coolant pump 6' directs coolant from an upstream direction to a downstream direction, as illustrated by arrows. The coolant pump 6' is in fluid communication with an internal combustion engine 8'. The internal combustion engine 8' includes a right cylinder bank 10' with an associated right cylinder head 12' and a left cylinder bank 14' with an associated left cylinder head 16'. The internal combustion engine 8' additionally includes a front cover 18'. The internal combustion engine 8' is provided with a water jacket (not specifically illustrated) which extends through individual regions of a wall of the int' and splits into a fluid passage B' flowing to the right cylinder bank and a fluid passage C' flowing to the left cylinder bank.

In a preferred embodiment, the temperature control system includes a first EGR cooler loop 64 and a second EGR cooler loop 66. Including a second EGR cooler loop 66 on the high temperature circuit 62, rather than on a low temperature circuit as in prior art cooling systems, provides various advantages such as reducing the risk of condensation forming within the EGR cooler.

The second EGR cooler loop 66 is in fluid communication with fluid passage B', downstream of the right cylinder head. A valve 22' is configured to control exhaust gas flow through the EGR cooler loops 64 and 66. Coolant flows through the EGR cooler loops 64 and 66 and the valve 22' to a crossover 24'. The crossover 24' is provided with a thermostat 26' configured to divide coolant among fluid passages E' and F' as will be discussed below.

Returning to fluid passage C', a portion of coolant flows from the left cylinder bank 14' to a turbocharger 28' and subsequently to the crossover 24'. A second portion of coolant flows from the left cylinder bank 14' to an oil cooler 30' and subsequently back to the coolant pump 6'. A third portion of coolant flows from the left cylinder head 16' to the thermostat 26'.

A portion of the coolant from the crossover 24' is directed to a cabin heater core 32' via fluid passage D'. The cabin heater core 32' is preferably designed as a gas/coolant heat exchanger. Coolant flows from the cabin heater core 32' back to the coolant pump 6'.

A second portion of coolant from the crossover 24' is directed back to the coolant pump 6' via the thermostat 26' and fluid passage E'.

A third portion of coolant from the crossover 24' is directed to a radiator 34' via the thermostat 26' and fluid passage F'. The radiator 34' is preferably a coolant/gas heat exchanger configured to remove heat from the coolant. Coolant flows from the radiator 34 back to the coolant pump 6'.

The relative quantities of coolant distributed among the fluid passages E' and F' is controlled by the thermostat 26'. The thermostat 26' may be an electronically controlled thermostat or valve. The thermostat 26' may also be configured to increase the coolant portion directed to the radiator 34' in response to an increase in coolant temperature.

The high temperature circuit 62 additionally includes a coolant reservoir 36'. The coolant reservoir stores coolant and compensates for any fluctuations in the coolant level. It also serves as a reserve volume to create space for the coolant expansion due to temperature increase. For this purpose, the coolant reservoir 36' is connected to various points in the high temperature circuit 62 by compensating lines, illustrated by the dashed lines.

In addition, the high temperature circuit 62 includes a transmission cooler 68. The transmission cooler 68 is fluidly coupled to the coolant pump 6' in an upstream direction by a fluid passage G. Fluid passage G is in fluid communication with fluid passage C' and bypasses the engine 8'. Including the transmission cooler 68 on the high temperature circuit 62 rather than an associated low temperature circuit provides various advantages. Coolant in the high temperature circuit 62 is relatively warmer, increasing the temperature and viscosity of transmission fluid and thus potentially increasing fuel economy. However, a temperature increase in the transmission cooler 68 may potentially exceed an allowable transmission fluid threshold. Thus, under some circumstances it may be desirable to increase coolant flow through the transmission cooler 68.

The transmission cooler 68 is thus fluidly coupled to the coolant pump 6' in a downstream direction via a flow regulator 70. The flow regulator 70 is preferably a wax thermostat, though other flow regulation mechanisms may be used. The flow regulator 70 is configured to increase coolant flow through the coolant passage G and transmission cooler 68 in response to an increase in coolant temperature. As an example, the flow regulator 70 may be configured to permit a range between 3 and 15% of coolant to flow through coolant passage G as a function of coolant temperature. A variable coolant quantity thus flows through coolant passage G through the transmission cooler, bypassing the engine 8' and other components in the high temperature circuit 62. At relatively higher temperatures, the flow regulator 70 permits an increased flow quantity through the coolant passage G to increase cooling of the transmission cooler, maintaining transmission fluid temperatures within an acceptable range.

As an additional benefit, at relatively cold temperatures, as may be experienced when starting an engine on a cold day, the flow regulator 70 allows relatively little coolant flow through passage G, minimizing a heat quantity lost to the transmission and maximizing a heat quantity available to heat the cabin via the cabin heater core 32'.

Figure 3:
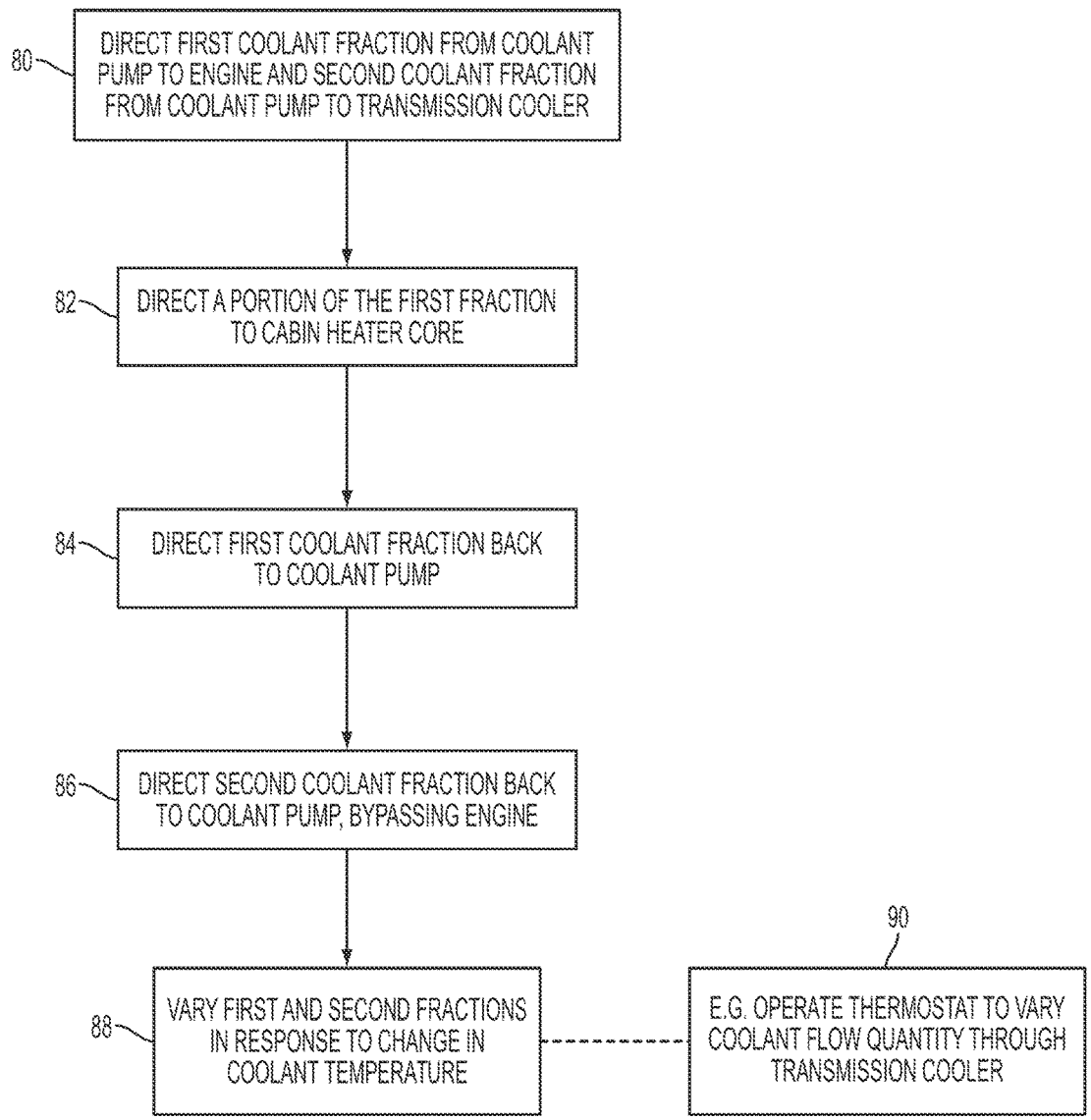
FIG. 3 illustrates a method of controlling temperature of transmission fluid according to the present disclosure.

Referring now to FIG. 3, a method of controlling a lubricant temperature in a motor vehicle transmission is illustrated in flowchart form. A first coolant fraction is directed from a coolant pump to an engine, and a second coolant fraction is directed from the coolant pump to a transmission cooler, as illustrated at block 80. A portion of the first fraction is directed to a cabin heater core, as illustrated at block 82. The first coolant fraction is directed back to the coolant pump, as illustrated at block 84. The second coolant fraction is directed back to the coolant pump, bypassing the engine, as illustrated at block 86. The first and second fractions are varied in response to a change in coolant temperature, as illustrated at block 88. This may include operating a thermostat to vary a coolant flow quantity through the transmission cooler, as illustrated at block 90.

As can be seen from the various embodiments, the present invention provides a temperature control arrangement that controls temperature in a transmission to balance between increasing fuel economy, maintaining allowable temperatures in transmission fluid, and providing customer comfort in cold temperatures.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a temperature of a lubricant in a motor vehicle transmission, the vehicle having a temperature control system comprising a coolant circuit fluidly connecting a coolant pump, an internal combustion engine, a transmission cooler, and a thermostat configured to adjust a coolant flow rate through the transmission cooler, the method comprising:
    directing a fraction of a coolant leaving the coolant pump to the internal combustion engine and subsequently back to the coolant pump;
    directing a remainder of the coolant leaving the coolant pump to the transmission cooler and subsequently back to the coolant pump, bypassing the internal combustion engine; and
    varying the fraction in response to a change in coolant temperature.

2. The method of claim 1 wherein the fraction of the coolant leaving the coolant pump to the internal combustion engine does not flow through the transmission cooler before returning to the coolant pump.

3. The method of claim 2, wherein varying the fraction comprises operating a thermostat to vary a coolant flow quantity through the transmission cooler.

4. The method of claim 2, wherein directing a fraction of a coolant to the internal combustion engine and subsequently back to the coolant pump comprises directing a portion of the fraction to a cabin heater core between the internal combustion engine and the coolant pump.

5. A vehicle cooling system comprising:
    a coolant pump;
    a first coolant loop directing a fraction of fluid from the pump through an engine and back to the pump;
    a second coolant loop directing a remainder of fluid from the pump through a transmission cooler and back to the pump, bypassing the engine; and
    a flow regulator configured to selectively restrict coolant flow through the second coolant loop.

6. The system of claim 5 wherein the first coolant loop bypasses the transmission cooler.

7. The vehicle cooling system of claim 6, wherein the flow regulator comprises a thermostat configured to decrease an amount of coolant flow through the second coolant loop in response to a decrease in a coolant temperature and increase an amount of coolant flow through the second coolant loop in response to an increase in a coolant temperature.

8. The vehicle cooling system of claim 6, wherein the internal combustion engine comprises a first cylinder head and a second cylinder head, and wherein the first coolant loop comprises a first coolant passage and a second coolant passage, the first coolant passage being fluidly connected to the first cylinder head and subsequently to the pump, and the second coolant passage being fluidly connected to the second cylinder head and subsequently to the pump.

9. The vehicle cooling system of claim 8, wherein the first coolant passage is additionally fluidly coupled to an EGR cooler between the first cylinder head and the pump.

10. The vehicle cooling system of claim 8, wherein the second coolant passage is additionally fluidly coupled to a turbocharger or an oil cooler between the second cylinder head and the pump.

11. The vehicle cooling system of claim 6, wherein the first coolant loop additionally connects the coolant pump to a cabin heater core and a radiator, the cabin heater core and radiator being in a downstream direction from the engine.

12. The method of claim 2, wherein the thermostat is downstream of the transmission cooler.

13. The method of claim 2, wherein the thermostat is between the coolant pump inlet and the transmission cooler.

14. The system of claim 6, wherein the thermostat is a wax thermostat.

* * * * *